Feb. 2, 1926.
S. G. DOWN
1,571,243
BRAKE SHOE CONSTRUCTION
Filed Nov. 17, 1923
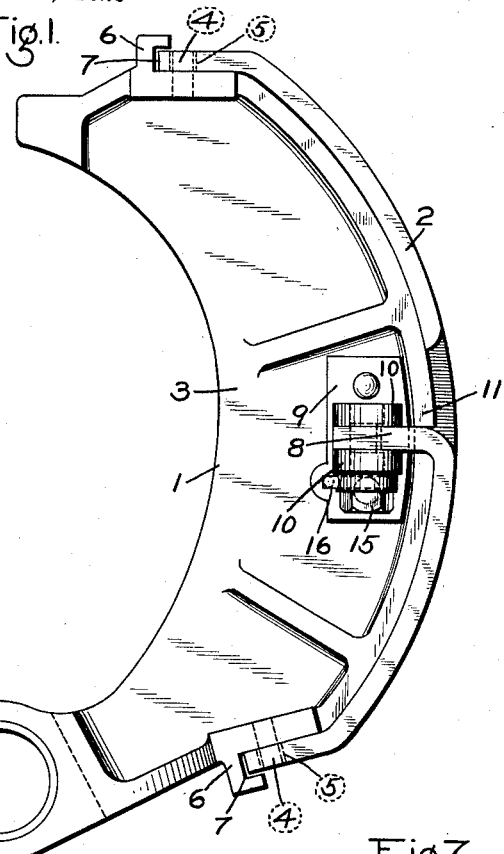
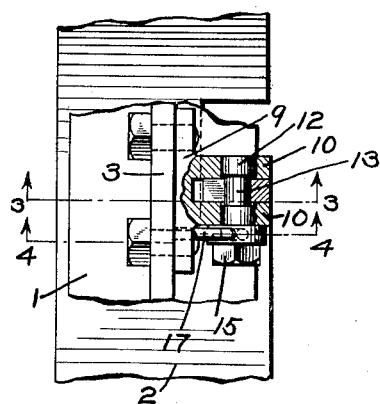
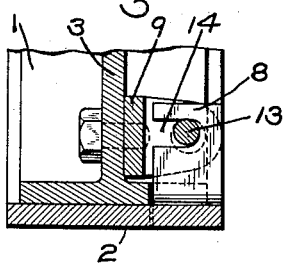
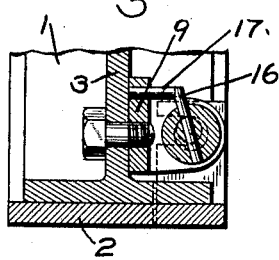
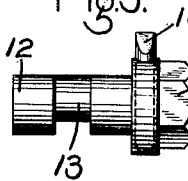
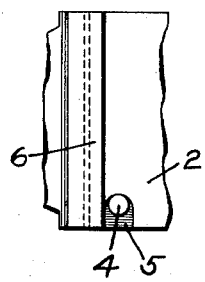
INVENTOR
SIDNEY G. DOWN
BY *Wm. M. Cady*
ATTORNEY Patented Feb. 2, 1926.

1,571,243

UNITED STATES PATENT OFFICE.

SIDNEY G. DOWN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-SHOE CONSTRUCTION.

Application filed November 17, 1923. Serial No. 675,281.

*To all whom it may concern:*

Be it known that I, SIDNEY G. DOWN, a citizen of the United States, residing at Pittsburgh, in the county of Allegheny and State of Pennsylvania, have invented new and useful Improvements in Brake-Shoe Constructions, of which the following is a specification.

This invention relates to brake shoes, and more particularly to a brake shoe construction adapted for the internal expanding drum type of brake, such as employed on motor vehicles.

The principal object of my invention is to provide an improved brake shoe construction of the above character.

In the accompanying drawing; Fig. 1 is a side elevation of a brake head, showing my improved brake shoe construction applied thereto; Fig. 2 an interior face view, partly in section, of the central portion of the brake shoe construction shown in Fig. 1; Fig. 3 a section on the line 3—3 of Fig. 2; Fig. 4 a section on the line 4—4 of Fig. 2; Fig. 5 a detail side view of the eccentric clamping pin; Fig. 6 an end view of said pin; and Fig. 7 a fragmentary face view of one of the end portions of the brake shoe construction.

The brake head 1, as shown in Fig. 1, may be of the usual internal expanding type having an arcuate face for receiving the brake shoe.

According to my invention, a metallic brake shoe 2 is provided which is bent to conform to the arcuate face of the brake head 1. At each end of the arcuate face, the brake head face is directed inwardly, away from the arcuate face and the opposite ends of the brake shoe are bent to fit said inwardly turned ends, so that the end portions of the brake shoe will not be subjected to wear.

At one side of the central web 3 of the brake head and at each of the inwardly turned ends, an upstanding pin 4 is provided and the brake shoe 2 is provided with a notch 5 at each end adapted to receive the corresponding pin 4, when the brake shoe is applied to the brake head. The brake head is also provided at each end with a raised portion 6 having a groove 7 adapted to receive the corresponding end portion of the brake shoe. At the side of the brake shoe opposite that having the notches 5, the central portion of the brake shoe is cut to permit the formation of a lug 8, by bending the cut portion inwardly, as shown in Fig. 1. Secured to the central portion of the web 3 is a bracket 9 provided with lugs 10, between which the shoe lug 8 is adapted to engage, the face flange 11 of the brake head being cut away or notched to permit the lug 8 to be positioned between the lugs 10.

A pin 12 having an eccentric portion 13 extends through the lugs 10 and the lug 8 is provided with a notch 14 adapted to engage over the eccentric portion 13, as more clearly shown in Fig. 3.

The brake shoe is applied to the brake head by an axial movement with respect to the brake head, so that the lug 8 engages between the lugs 10, the slot 14 engaging the eccentric portion 13 of the pin 12 and the pins 4 engaging the slots 5 at the ends of the brake shoe.

The shoe 2 is bent to a slightly smaller radius of curvature than the radius of curvature of the arcuate face of the brake head, so that when the pin 12 is rotated by a wrench applied to the head 15, the spring of the brake shoe resists the clamping action, due to the rotation of the eccentric portion 13. The pin 12 is rotated, so that the high point of the eccentric is shifted to a position slightly past the center line of the pin, and thus the spring of the brake shoe resists backward rotative movement of the pin and loosening of the attachment. Movement of the pin 12 beyond the above defined position is prevented by the engagement of a pin 16 extending through the pin 12 with a stop pin 17.

The above described rotation of pin 12 securely clamps the brake shoe 2 to the brake head 1 by means of a single fastening, but at the same time, side and radial displacement of the shoe is prevented, side displacement by pins 4 and radial displacement by the raised portions 6.

Having now described my invention, what I claim as new and desire to secure by Letters Patent, is:—

The combination with a brake head having a convex arcuate face, of a brake shoe comprising a plate bent to engage said face and having a centrally located inwardly bent lug cut from one side of the plate, a bracket secured to said head and having lugs forming a radially disposed slot for receiving the brake shoe lug, and means for securing said lug to said bracket.

In testimony whereof I have hereunto set my hand.

SIDNEY G. DOWN.